United States Patent [19]
Letendre et al.

[11] Patent Number: 5,406,889
[45] Date of Patent: Apr. 18, 1995

[54] DIRECT LASER IGNITION OF IGNITION PRODUCTS

[75] Inventors: Guy R. Letendre; Virginia E. Chandler, both of Ogden; David B. Monk, Kaysville, all of Utah

[73] Assignee: Morton International, Inc., Chicago, Ill.

[21] Appl. No.: 116,929

[22] Filed: Sep. 3, 1993

[51] Int. Cl.$^6$ .................. F42C 19/00; B60R 21/16
[52] U.S. Cl. ........................ 102/201; 280/728 R
[58] Field of Search .................... 102/201, 213; 280/728 R; 361/248

[56] References Cited

U.S. PATENT DOCUMENTS

| | | | |
|---|---|---|---|
| 3,408,937 | 11/1968 | Lewis et al. | 102/201 |
| 3,528,372 | 9/1970 | Lewis et al. | 102/201 |
| 4,110,812 | 8/1978 | Arutunian et al. | 102/203 |
| 5,052,300 | 10/1991 | Josse | 102/201 |
| 5,179,247 | 1/1993 | Hawley | 102/201 |
| 5,191,167 | 3/1993 | Beyer | 102/201 |
| 5,301,448 | 4/1994 | Patrick et al. | 102/201 |

Primary Examiner—Daniel T. Pihulic
Attorney, Agent, or Firm—Mark F. LaMarre; Nick C. Kottis; Gerald K. White

[57] ABSTRACT

A device is provided for ignition of a pyrotechnic or hybrid inflator for use in motor vehicles by the input of energy provided by a laser source. The laser energy is conducted through an optical fibre and an optical window in the inflator housing where the ignition of a propellant initiator is triggered. This apparatus eliminates the potential for ignition of the inflator by radio frequency energy or static electricity acting on the electrical squib which is standardly used to ignite an inflator. This design further simplifies the igniter assembly for use in an inflator.

6 Claims, 3 Drawing Sheets

DIRECT LASER IGNITION OF IGNITION PRODUCTS

BACKGROUND OF THE INVENTION

1. Field of the Invention

The present invention relates to gas generators for inflating vehicle inflatable restraint cushions, commonly known as an air bag restraint systems, so as to provide impact protection to occupants of the vehicles. More particularly, this invention relates to an improved apparatus for the ignition of gas generating material within the inflator.

2. Description of Related Art

The part of an air bag restraint system for use in the passenger compartment of a vehicle, referred to as an air bag module, typically includes a canister, which encloses a gas generator, or as it is commonly known an inflator, and at least part of an air bag, and a cover which conceals the air bag module from view. When the vehicle is involved in a collision, a crash signal initiates operation of the inflator to cause the air bag to deploy. The inflator produces an inert gas (e.g., nitrogen) which is directed under pressure into the air bag to force the air bag out of the canister incorporated in the module and into the passenger compartment of the vehicle. In a pyrotechnic type, inflator gas is produced by the burning of a gas generating material. As the air bag is forced out of the container, pressure exerted on the cover causes selected portions of the cover to separate in a predetermined manner along tear seams to enable the air bag to be directed into the passenger compartment. As the air bag is directed into the passenger compartment, it is inflated by the continued flow of gas produced by the inflator.

The gas generator for a passenger vehicle includes a disk-shaped or a cylindrical housing having openings therein for release of gas. A gas generating material is deployed in the interior of the housing in pellet or wafer form. A cooling and filtering structure surrounds the combustible gas generating material charge in order to filter out hot or burning particles and cool the gas produced by the gas generating material. Ignition of the gas generating material is achieved by an igniter tube extending through the gas generating material along the axis of the charge and the housing. The tube typically contains a rapid detonation or deflagration cord, or fuse, and igniter powder. An electric initiator and charge, or squib, is mounted to the housing and lights the rapid deflagration cord. The rapid deflagration cord in turn sets off the igniter powder, which bursts the igniter tube and lights the gas generating material.

Typically, the energizing terminals of electric squibs are connected by parallel rod conductors to the interior of a container or cup containing a pyrotechnic material. In another form, a coaxial type, one of the conductors is tubular in form and the other conductor is a rod centrally positioned therein. The ends of the conductors in the container, in both types of electric squibs, are joined together by a resistance wire or bridge that is designed to rapidly heat the pyrotechnic material to its ignition temperature when energized with sufficient electrical current.

A long standing problem with electric squibs is that their energizing terminals tend to function as antennas that pick up extraneous radio-frequency and electrostatic energy. Radar signals are of particular concern because of their tendency to form transitory peaks of high intensity that are capable of firing the squib. Such firing is caused either by heating the pyrotechnic material of the squib to its flame temperature by way of a contiguous, metallic part, or by corona discharge or sparking into the pyrotechnic material.

A solution to the problem has been proposed by Holmes, U.S. Pat. No. 4,306,499, which patent is assigned to the assignee of the present invention. Holmes discloses a pair of normally ungrounded terminals surrounded by a chamber holding ferrite beads. The ferrite beads are in thermal contact with the grounded chamber walls. The ferrite beads dissipate radio-frequency electrical energy and the heat generated thereby is conducted to the grounded walls and into a heat sink. This arrangement does not provide adequate dissipation of radio-frequency during prolonged or high energy outbursts. Further, the overall design and assembly of the inflator could be drastically simplified by the elimination of an electrically energized squib. Therefore, it is preferable to eliminate electrical initiation of an air bag inflator through conductive wires such as is used in a squib.

Lewis et al., U.S. Pat. No. 3,408,937, discloses the use of laser radiation to detonate multiple explosive devices for use in space craft. The intense radiation produced by the laser is conducted through multiple light conductors to the multiple explosive devices. The explosive devices are used to provide for the rapid separation or deployment of equipment and safety devices within the space craft.

SUMMARY OF THE INVENTION

An object of this invention is to eliminate the potential of accidental ignition of an automotive air bag inflator due to the effect of radar and other sources of extraneous radio-frequency on an unshielded or ungrounded squib.

Another object of this invention is to eliminate the potential of accidental ignition of an automotive air bag inflator due to the effect of the build-up of electrostatic energy on an unshielded or ungrounded squib.

Another object of this invention is to provide a simplified ignition chain for initiating the gas generating process within an air bag inflator.

These and other objectives of the invention, which will become apparent from the following description, have been achieved by a novel ignition device for use with a gas generator for use in motor vehicles comprising, a laser source to supply radiant energy, an optical conductor to carry the radiant energy from the laser source, and an automotive air bag gas generator provided with an optical window to conduct the radiant energy from the optical conductor to a propellant initiator means which in turn ignites the gas generating material inside the gas generator.

The optical conductor, for use with this invention, is typically an optical fiber. The gas generator, or as it is more commonly known as an inflator, comprises a hollow open-ended housing which contains a propellant initiator means, a gas generating material, and means to filter and cool the generated gas. Apertures in the walls of the inflator permit generated gases to flow from the inflator to an automotive air bag cushion. A novel end cap, having an aperture into which is sealed an optical window, caps the inflator to form a sealed combustion chamber. The optical window conducts radiation carried by the optical fiber to the propellant initiator means. Optical contact must be provided between the optical fiber, the optical window, and the propellant initiator means.

The device of this invention can be used with the elongated cylindrical housings used for passenger side inflators, the disk-shaped circular housing typically used for driver side inflators, a hybrid inflator or any inflator which normally uses an electrical squib to initiate the burning of a gas generating material.

The propellant initiator means can be any initiator known in the art. When a passenger side inflator is used, a linear deflagration cord is used as the propellant initiator means. To ensure proper optical contact between one end of the linear deflagration cord and the optical window a collet having a central aperture is inserted over one end of the linear deflagration cord. The linear deflagration cord can be threaded into the collet to ensure that the linear deflagration cord will not move from the optical window. The collet and in turn the linear deflagration cord are then held into position by a support means which is in close proximity to the optical window. A spring means may be inserted between the collet and the support means thereby improving the optical contact between the end of the linear deflagration cord and the optical window.

BRIEF DESCRIPTION OF THE DRAWINGS

With this description of the invention, a detailed description follows with reference being made to the accompanying figures of drawings which form part of the specification, in which like parts are designated by the same reference numbers, and of which.

DETAILED DESCRIPTION OF THE INVENTION

Description of the Preferred Embodiments

Figures 1, 2:
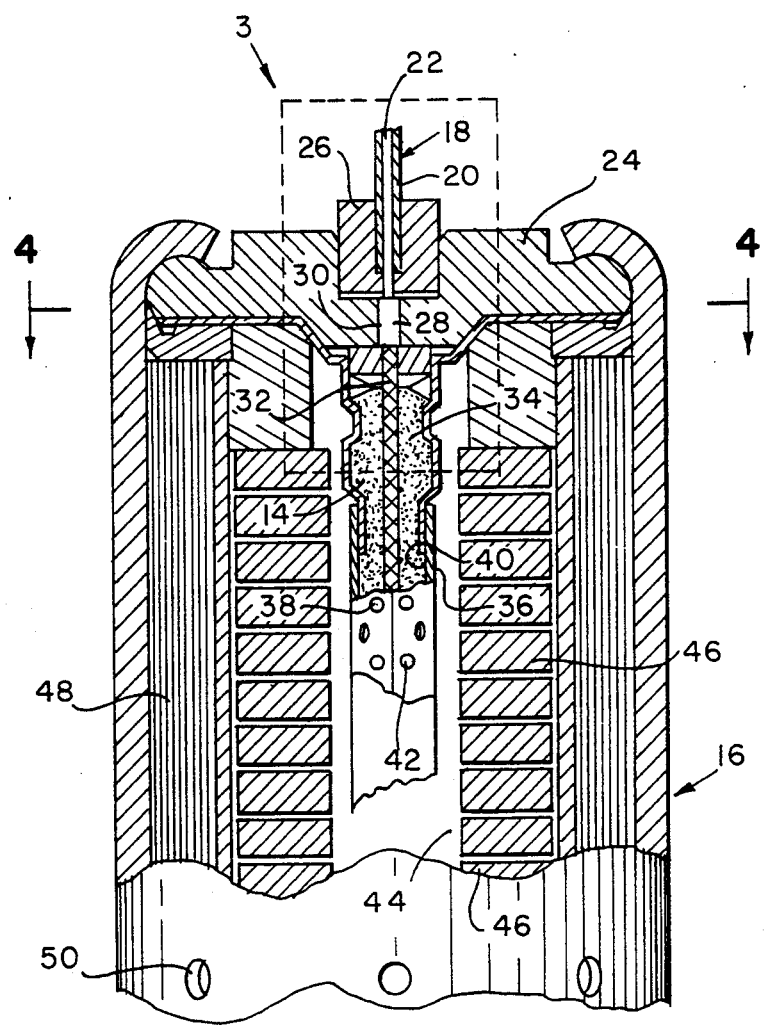
FIG. 1 is a diagrammatical view illustrating the components comprising the ignition system of the invention.
FIG. 2 is a cross-sectional view illustrating a gas generator with attached optical fiber for conducting radiant energy from the laser.

FIG. 1, diagrammatically shows an inflator ignition system of this invention, with a DERM 10 (Diagnostic Energy Reserve Module) (shown herein as a black box), which contains diagnostics for analyzing the input from sensors (not shown), electrical switches and associated equipment, a power supply, and a laser source 12 which emits a coherent light beam of the appropriate frequency to ignite the propellant initiator means 14 (shown in FIG. 2). The laser source 12 is coupled to an inflator 16 via optical fibre cable 18 comprising an external coating 20 and an optical fibre or optical fibre bundle 22 (shown in FIG. 2). The optical fibre bundle 22 may comprise one or more optical fibres. Herein, for the sake of simplifying the drawings a single optical fibre 22 is shown as the bundle. Further, herein, for the purpose of simplicity a single laser source 12 connected to a single inflator 16 is shown. However, multiple laser sources 12 may be used to provide a back-up ignition source should one laser source 12 be damaged. In addition, a single laser source 12 may be used, by means of an appropriate coupling and switching network, to ignite more than one inflator 16.

Figure 3:
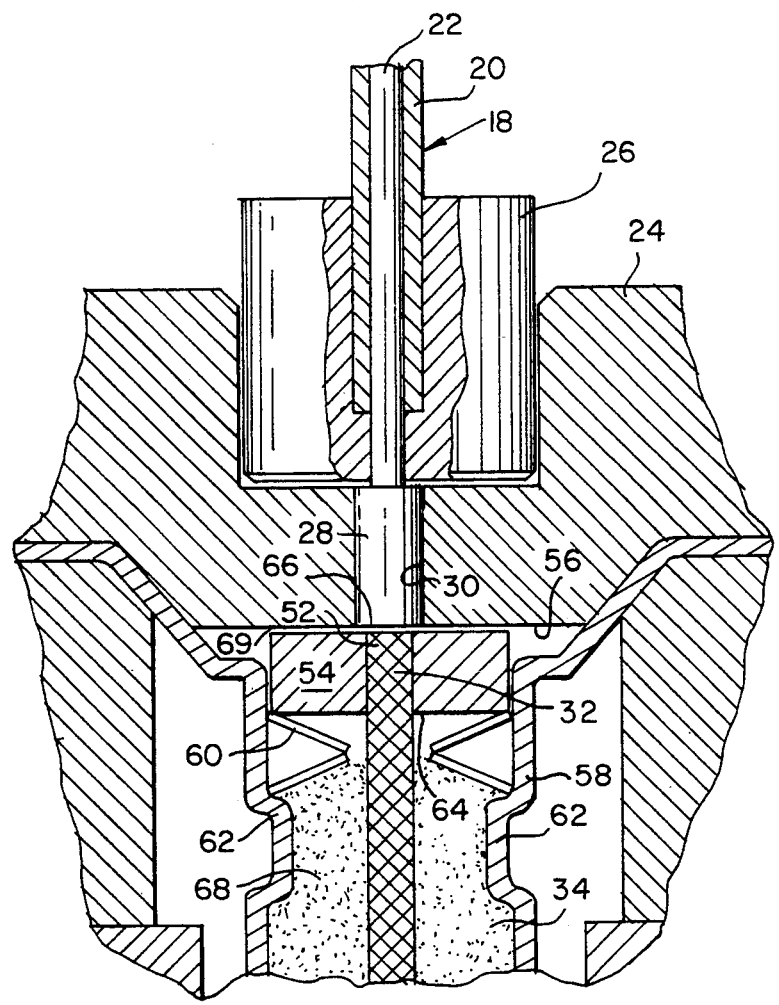
FIG. 3 is an enlargement of section 3 of FIG. 2.
Figure 4:
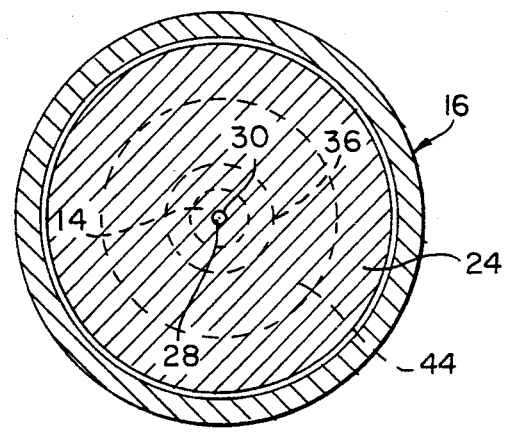
FIG. 4 is a cross-sectional view taken along line 4—4 of FIG. 2 illustrating the arrangement of the ignition system.

The inflator 16 of this invention is shown in side cross-sectional view in FIG. 2 and in detail in FIG. 3. The optical fibre cable 18 conveying radiation is attached to an end cap 24 of inflator 16 by connector 26. The optical connector 26 is optically coupled to an optical window 28. "Optically coupled" or "coupled optically" herein means that a first object is aligned with a second object such that radiation may be conducted from the first object to the second object without a significant loss in the amplitude of the radiation. "Optically coupled" or "coupled optically" does not require physical contact between the first object and the second object. The optical window 28 is sealed in a first aperture 30 formed in end cap 24. The optical window 28 is transparent at the frequency of light used to initiate the inflator 16. The optical window 28 is optically coupled with a propellant initiator means or igniter shown generally at 14. The arrangement of the aforementioned elements is shown in a top cross-sectional view in FIG. 4 to clarify the interrelation of the components.

To ensure that the inflator remains sealed during operation so that generated gases follow the intended path, the optical window 28 must be hermetically sealed into the inflator end cap 24. This can be achieved by fixing a glass chip in aperture 30 and heating the end cap 24 to expand the metal from which the end cap 24 is made. Through a series of heating steps the glass is melted so that the molten glass flows and fuses with the walls of the aperture. As the end cap 24 is cooled, the glass solidifies and bonds with the metal thereby forming a gas tight seal. Also, as the metal of the end cap 24 contracts the optical window 28 is compression sealed into the first aperture 30 thus further ensuring a gas tight seal.

The igniter 14 normally comprises an RDC 32 Rapid Deflagration Cord located generally in the center of the igniter 14. The RDC 32 is surrounded by igniter material 34, which is a mechanical mixture of boron and potassium nitrate (BKNO$_3$), typically 25% boron and 75% potassium nitrate. The igniter material 34 is held in an igniter housing 36 by a thin layer of barrier foil which is attached to the inside surface 40 of the igniter housing 36. Upon ignition of igniter material 34, hot ignition gases build pressure within the igniter 14, rupturing the barrier foil 38 and emerging from the igniter housing 36 through apertures 42, initiating the burning of the gas generating material 44. The gas generating material 44 is shown here as wafers 46, which are typically used in passenger side inflators 16. Gas generated by the gas generating material 44 is filtered and cooled by a filter pack 48 and exits the inflator through inflator apertures 50.

To ensure optical coupling between the optical window 28 and the ignition end 52 of the RDC 32, the RDC 32 can be attached to a collet 54, by appropriate means such as threading the RDC 32 into collet 54. The collet 54 is held in place adjacent to the interior surface 56 of end cap 24 by a retainer 58 attached to the igniter housing 36. Springs 60 inserted between retainer platform 62 and the base 64 of the collet 54 press the ignition end 52 of the RDC 32 against the inner surface 66 of optical window 28. The RDC 32 passes through aperture 68 formed by the retainer 58. However, an optional gap 69 may be provided between the ignition end 52 of the RDC 32 an the inner surface 66 of the optical window 28. Where a gap 69 is provided the RDC 32 must still be optically coupled with the optical window 28.

Figure 5:
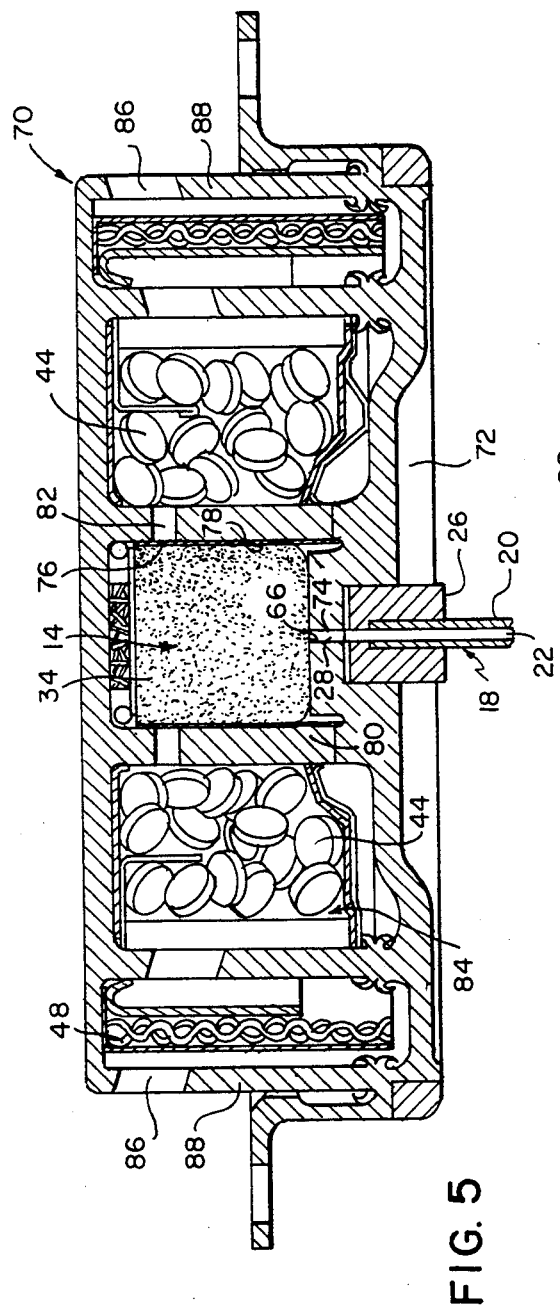
FIG. 5 is a cross-sectional view illustrating the laser ignition system of this invention installed into a driver side inflator.

The operation of this invention with a driver side module is illustrated in FIG. 5, wherein a driver side inflator is shown generally at 70. Where like components to those used in the passenger side inflator 16 are used the same reference number is also used. The optical fibre cable 18 conducting radiation from the laser source 12 is attached to the base plate 72 of the driver side inflator 70 by connector 26. The optical fibre 22 is optically coupled to the optical window 28 sealed in first aperture 74 in the base plate 72 of driver side inflator 70. The inner surface 66 of the optical window 28 is optically coupled to igniter 14. Upon ignition, igniter 14 generates high temperature gases which rupture barrier foil 76 on the inside surface 78 of the ignition chamber 80. The hot gases are conveyed through aperture 82 into the gas generator chamber 84 where the gas generating material 44 is ignited. Generated gas passes through filter pack 48 and exits through apertures 86 formed in the outer wall 88 of the driver side inflator 70.

Figure 6:
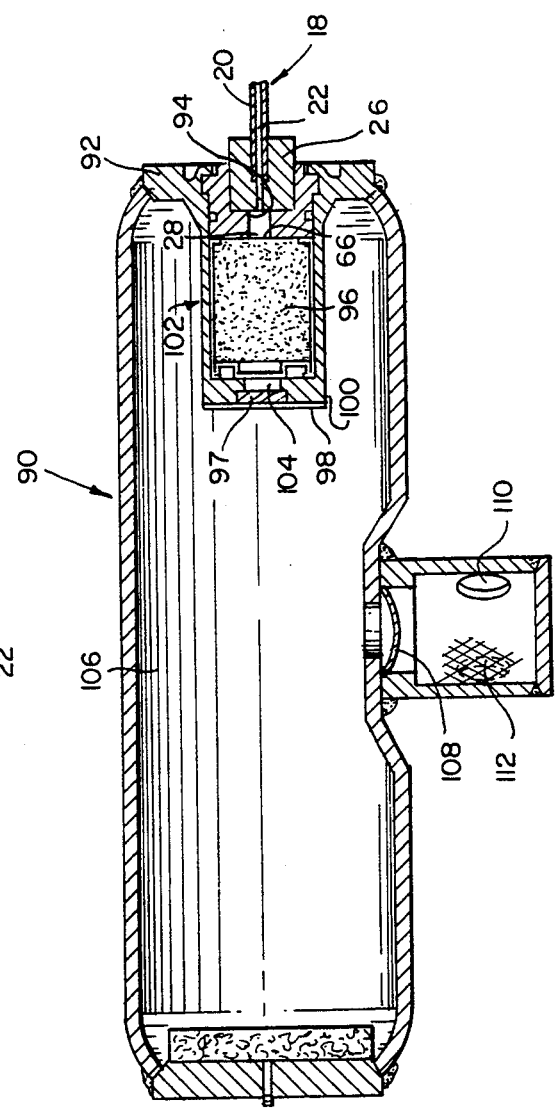
FIG. 6 is a cross-sectional view illustrating the laser ignition system of this invention installed into a hybrid inflator.

The operation of this invention with a hybrid module is illustrated in FIG. 6, wherein a hybrid inflator is shown generally at 90. Where like components to those used in the passenger side inflator 16 are used the same reference number is also used. The optical fibre cable 18 conducting radiation from the laser source 12 is attached to the base plate 92 of the hybrid inflator 90 by connector 26. The optical fibre 22 is optically coupled to the optical window 28 sealed in first aperture 94 in the base plate 92 of driver side inflator 90. The inner surface 66 of the optical window is optically coupled to igniter 96. Upon ignition, igniter 96 generates high temperature gases which force plug 97 out of the igniter 96, rupturing barrier foil 98 on the outside surface 100 of the ignition chamber 102. The hot gases are conveyed through aperture 104, into the pressurized gas chamber 106, heating the pressurized gas 44. The overpressurized gas causes membrane 108 to rupture, forcing the gas to exit through exhaust apertures 110 formed in diffuser 112 of the hybrid inflator 90.

The inflators 16, 70, and 90 for use with this invention can be any inflators known to those of ordinary skill in the art. Modification of the end cap 24 and base plates 72 and 92 may be necessary to accommodate the optical window 28. In order to minimize weight, the inflators 16 and 70, are typically composed of aluminum.

A signal from a crash sensor (not shown) is processed by the DERM 10 the output from which is provided by the laser source 12 through optical fibre cable 18. The radiation passing through the optical fibre cable 18 passes through optical window 26 and initiates the burning of igniter 14. The igniter 14 initiates burning of the gas generating material 44. The gas produced exits the inflator 16 and flows into the air bag cushion from the inflator 16 through the air bag cushion gas inlet. The expanding air bag cushion ruptures the tearseam of the module cover, or opens the hinged cover, and starts to deploy into the vehicle passenger compartment. Absent the input from the laser source 12 to the igniter 14 the inflator 16 will not initiate gas generation under normal storage and operating conditions due to the absence of any components capable of processing radio-frequency energy or static electricity into heat energy.

Thus, in accordance with the invention, there has been provided a means to eliminate the potential of accidental ignition of an automotive air bag inflator due to the effect of radar and other sources of extraneous radio-frequency on an unshielded or ungrounded squib. There has also been provided a means to eliminate the potential of accidental ignition of an automotive air bag inflator due to the effect of the build-up of electrostatic energy on an unshielded or ungrounded squib. Additionally, there has been provided a simplified ignition chain for initiating the gas generating process within an air bag inflator.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope of the invention be determined by the scope of the appended claims.

We claim:

1. An apparatus for providing inert gas to inflate an inflatable vehicle restraint cushion, said apparatus comprising:
   a laser source of radiant energy;
   an optical fiber for conducting radiant energy from said laser source;
   an inflator comprising an open-ended housing which contains a propellant initiator means, a gas generating material, means to filter and cool generated gas, and at least one aperture to permit generated gas to flow from said inflator to said inflatable vehicle restraint cushion;
   closing means to seal said open-ended housing, said closing means having an optical window generally in the central region thereof, said optical window having a first surface and a second surface, said first surface being optically coupled with said optical fiber;
   said propellant initiator means comprising a rapid deflagration cord having a first end and a second end, said first end being optically coupled with said second surface of said optical window, and said second end being positioned in said propellant initiator means so as to initiate burning of said gas generating material upon ignition of said rapid deflagration cord by said radiant energy.

2. An apparatus as set forth in claim 1, wherein said inflatable vehicle restraint cushion is a passenger side air bag.

3. An apparatus as set forth in claim 2, wherein said first end of said rapid deflagration cord is attached to a collet adjacent the interior surface of said closing means.

4. An apparatus as set forth in claim 2, wherein said gas generating material comprises wafers.

5. An apparatus as set forth in claim 1, wherein said inflatable vehicle restraint cushion is a driver side air bag.

6. An apparatus for providing inert gas to inflate an inflatable vehicle restraint cushion, said apparatus comprising:
   a laser source of radiant energy;
   an optical fiber for conducting radiant energy from said laser source;
   a hybrid inflator module comprising a housing which contains an igniter, a pressurized inert gas, a chamber to contain said gas, and at least one aperture to permit said gas to flow from said inflator module to said inflatable vehicle restraint cushion;

closing means to seal said housing, said closing means having an optical window therein, said optical window having a first surface and a second surface, said first surface being optically coupled with said optical fiber, and said second surface optically coupled with said igniter so as to initiate generation of hot gases upon ignition by said radiant energy.

* * * * *

UNITED STATES PATENT AND TRADEMARK OFFICE
CERTIFICATE OF CORRECTION

PATENT NO. : 5,406,889
DATED : April 18, 1995
INVENTOR(S) : Letendre, et. al.

It is certified that error appears in the above-indentified patent and that said Letters Patent is hereby corrected as shown below:

Column 4, line 47, "barrier foil" should be --barrier foil 38--.

Column 5, line 20, "SO." should be --80.--

Column 5, line 44, the capital letter "O" in "11O" should be a zero--$\overline{1}$10--.

Signed and Sealed this

Second Day of July, 1996

Attest:

BRUCE LEHMAN

*Attesting Officer*    *Commissioner of Patents and Trademarks*